April 18, 1950 P. H. GOODELL 2,504,516
ELECTRICALLY HEATED OVEN
Filed Sept. 30, 1944 5 Sheets-Sheet 1

INVENTOR
Paul H. Goodell
BY
ATTORNEY

April 18, 1950 P. H. GOODELL 2,504,516
ELECTRICALLY HEATED OVEN
Filed Sept. 30, 1944 5 Sheets-Sheet 2
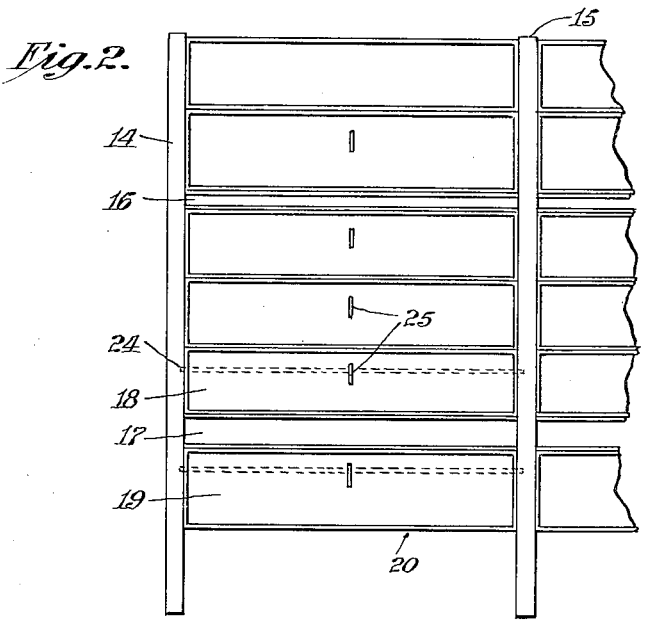
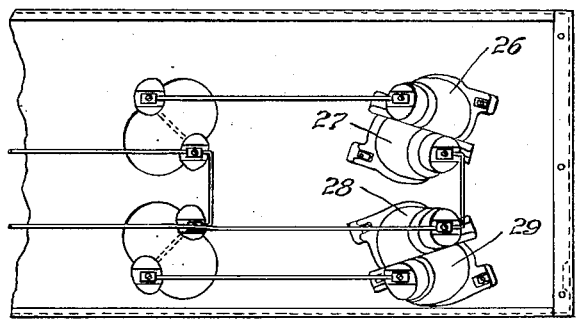
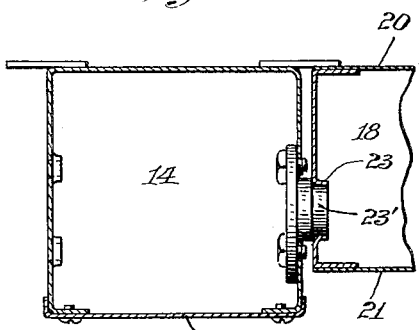
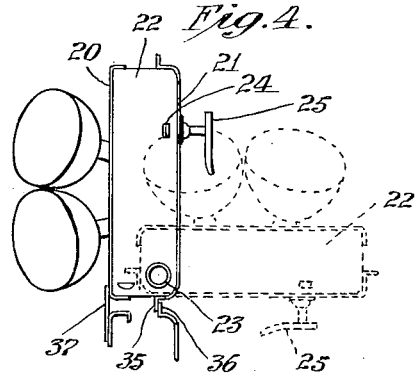
INVENTOR
Paul H. Goodell
BY
ATTORNEY

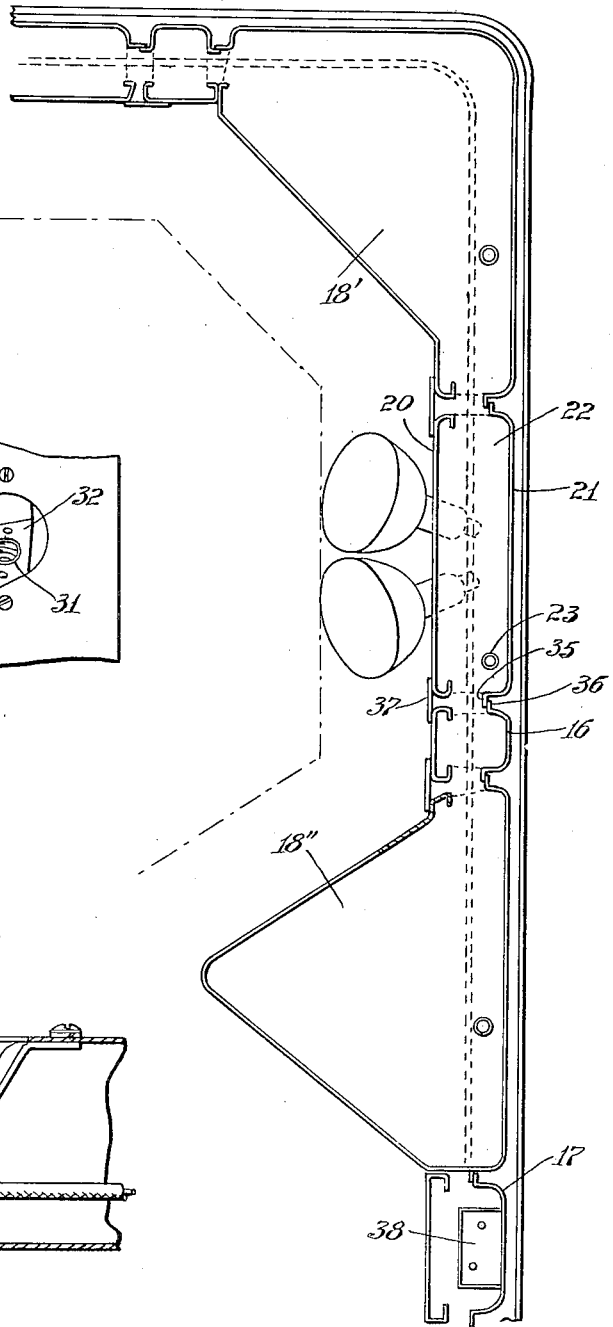
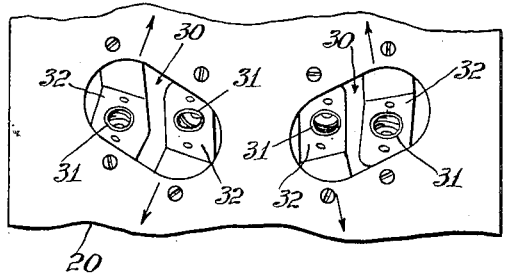
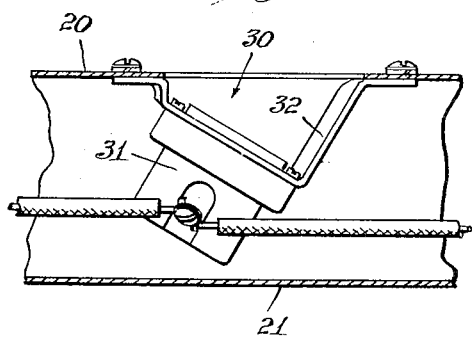

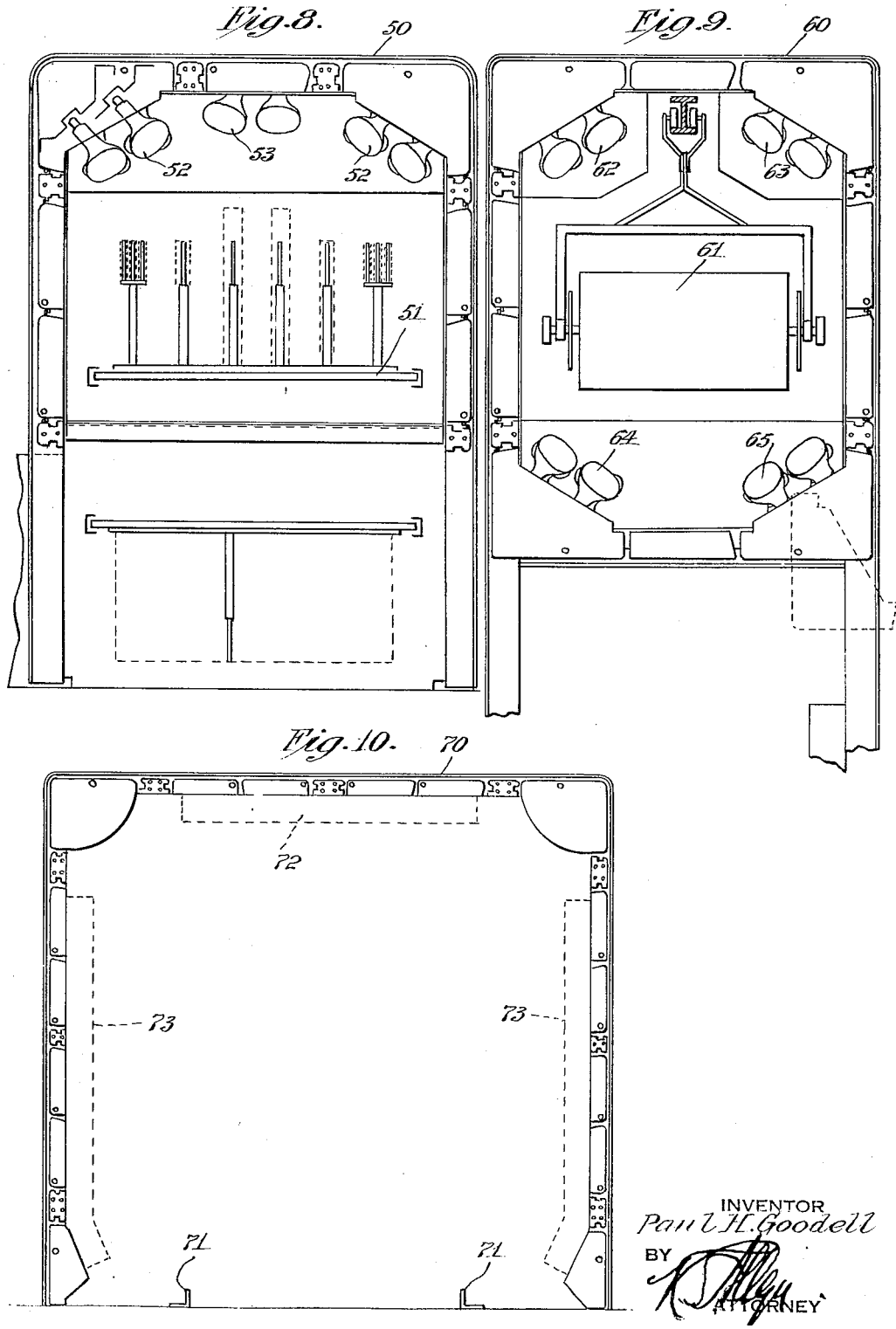

April 18, 1950      P. H. GOODELL      2,504,516
ELECTRICALLY HEATED OVEN
Filed Sept. 30, 1944      5 Sheets-Sheet 5
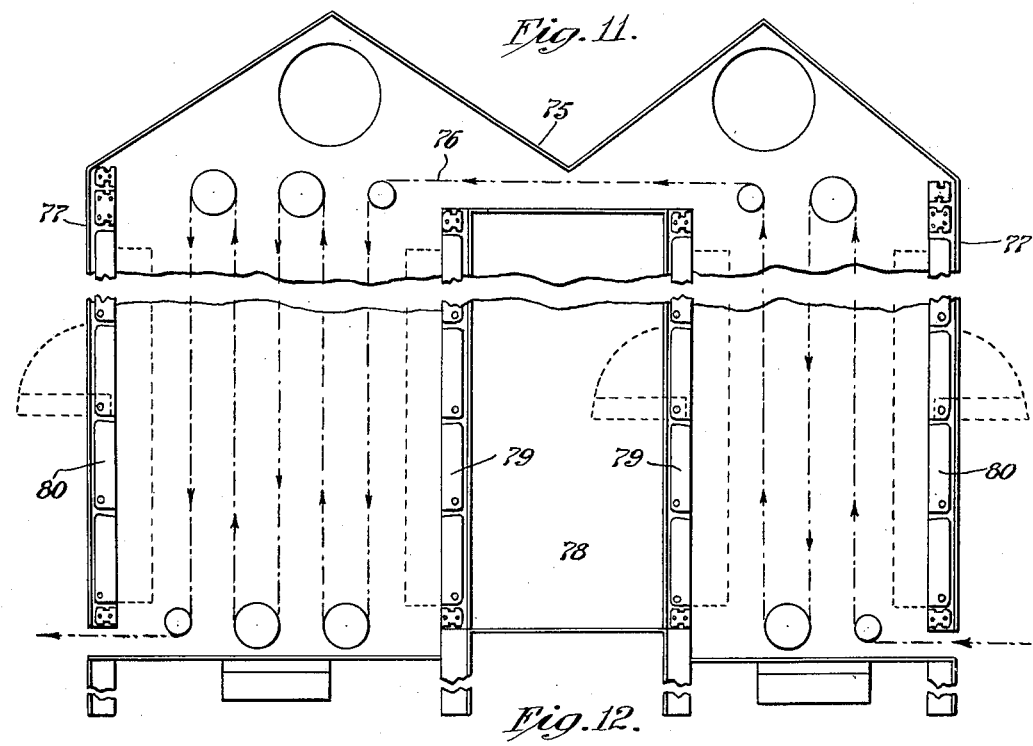
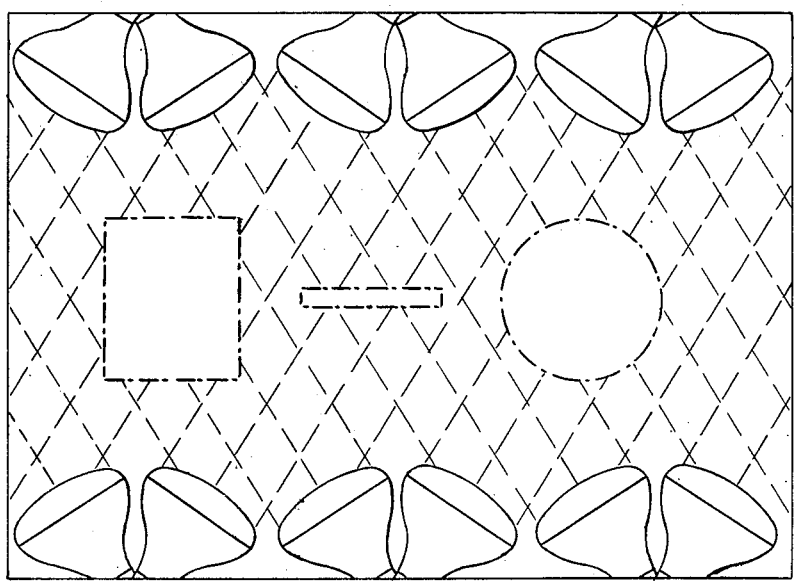
INVENTOR
Paul H. Goodell
BY
ATTORNEY Patented Apr. 18, 1950

2,504,516

UNITED STATES PATENT OFFICE 2,504,516

ELECTRICALLY HEATED OVEN

Paul Homer Goodell, Cincinnati, Ohio, assignor to The Trumbull Electric Manufacturing Company, Plainville, Conn., a corporation of Connecticut Application September 30, 1944, Serial No. 556,551

7 Claims. (Cl. 219—35)

My invention relates to that type of oven which utilizes the many advantages of radiant heating with so-called infra red equipment and in its preferred form I also plan to combine the advantages of heating by convection.

It is the main object of my invention to provide a construction capable of utilizing some or all of the advantages of radiation and convection in an oven employing infra red heating. The convection being provided either as the by-product result of the infra-red or by supplemental convection heaters. Another important object is to secure economy of operation and in a minimum space. It will be seen that the invention is equally applicable to ovens for treatment of stationary work or to continuous process operations utilizing conveyors or self-propelled work.

Another object is to provide an improved means of heating with infra-red lamp equipment. This is accomplished by a unique method of grouping the lamps with their axes inclined at divergent angles so that all sides and recesses of the work are uniformly heated since it has been found in practice with former ovens that objects of irregular shape and varying size are likely to be unevenly heated.

Another object is to provide means for facilitating erection of an oven of almost any size, shape and number of heating zones from a number of stock items.

For instance, in commercial practice it is often desirable to provide as many as four heating zones. In the first zone as the products enter the oven, convection alone may be employed for pre-heating the work. In the second zone the maximum practical concentration of radiant energy may be applied for raising the work to its desired temperature in a minimum time. In the third zone a lower concentration of radiant energy may be employed in combination with convection to replace surface heat as it is absorbed by conduction into the work or carried off by the surrounding air. The fourth zone may employ convection alone in combination with the residual heat retained in the work to complete the desired cycle.

The oven in its preferred form consists of a framework of hollow or tubular members with hollow panels mounted between horizontal and vertical members so as to form the walls. These panels are hinged to the framework and carry the infra-red lamps or other heat sources. In this way inspection of the work, heat sources and replacement of heat sources are greatly facilitated and the cost of maintenance minimized.

The hollow panels and framework provide not only convenient channels for wiring the lamps but passages for the circulation of air for cooling the lamp sockets and bases and for preheating air to be used in the oven working zone.

Fig. 2 is a side view of a part of such an oven on an even smaller scale.

Fig. 3 is a horizontal sectional view showing how a lamp panel is supported by the adjacent columnar duct.

Fig. 4 is an end view of a straight lamp panel and showing its position when swung outward to permit access to the lamps and to the interior of the oven.

Fig. 4a is an inside view of a fragment of a panel showing the arrangement of a group of four lamp sockets and wiring thereto.

Fig. 5 is a fragmentary vertical sectional view showing three forms of panel units with adjoining ribs and wiring channels. Each type of panel unit may be rotated, as in Fig. 4, while the ribs or channels are stationary structural elements.

Figs. 6 and 7 are detail views showing how the lamp sockets may be supported.

Figs. 8, 9 and 10 are small scale vertical sections showing different arrangements of oven panels, Fig. 9 showing a panel swung to open position.

Fig. 11 is a diagrammatic vertical section of a duplex tower type of oven.

Fig. 12 is a diagram showing one form of heat distribution pattern.

Figure 1:
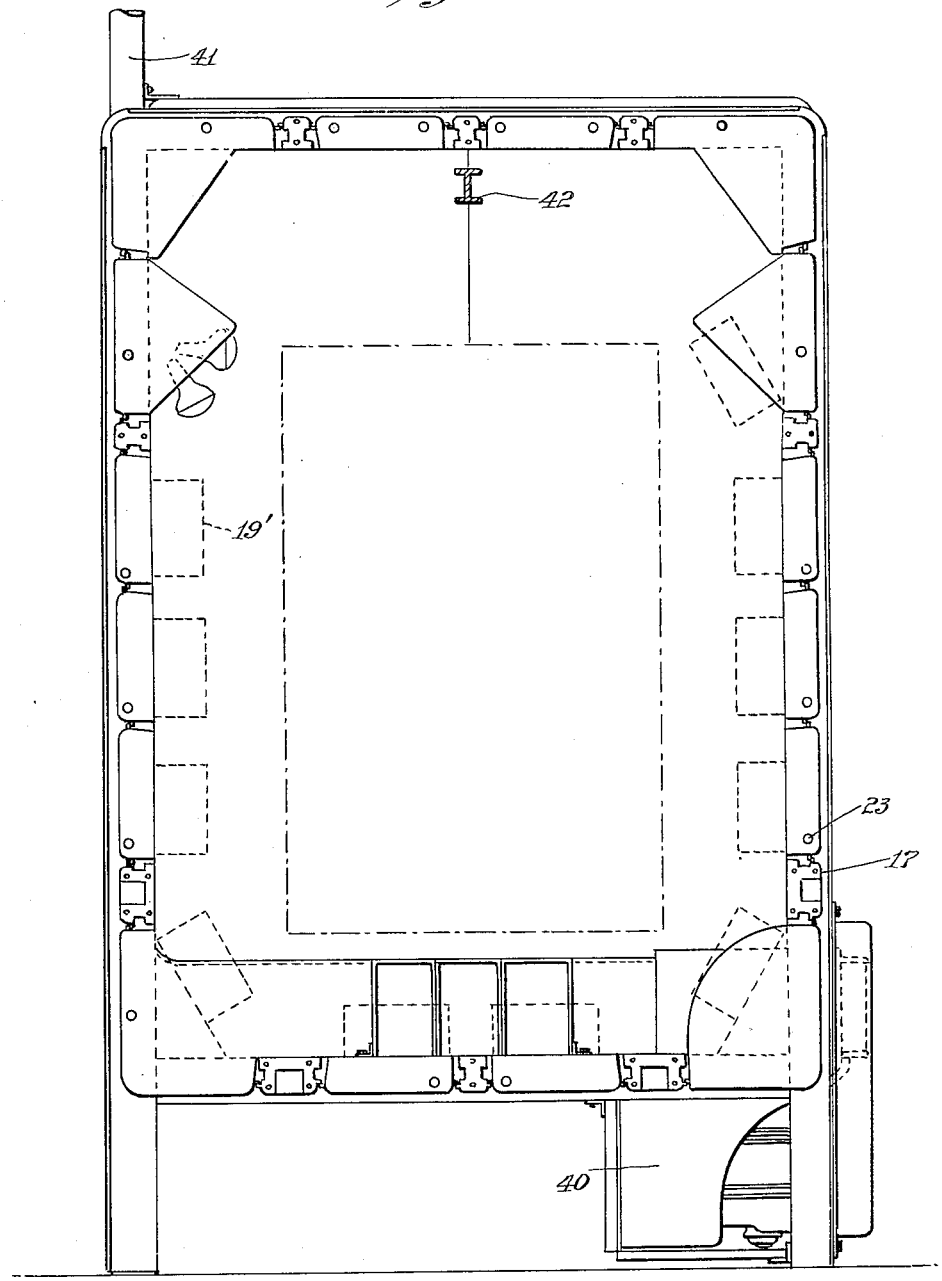
Fig. 1 is a diagrammatic vertical section and end view on a small scale showing one form of oven involving my invention.

The housing or casing within which the work is to be heated will, of course, be of a size and shape to accommodate the work. Preferably it is made up of a framework having movable panels carrying the lamps arranged to radiate toward the areas to be heated. This framework will have vertical members such as 14 and 15 and horizontal members such as 16 and 17. Some or all of these members are formed of sheet metal and are hollow so as to provide runways for electric wiring and ducts for air passage. The panels 18, 19, etc. constitute the principal parts of the walls and carry the heating lamps. A typical panel is shown in Figs. 2, 3 and 4 where the inner and outer walls 20 and 21 are spaced apart in a suitable manner with a space 22 between them to constitute an air chamber and for insulation and to serve as a housing for the lamp sockets. Each panel is preferably hinged at 23 between adjacent uprights and provided with a suitable latch 24 and operating handle 25. This latch engages the uprights as indicated in Fig. 2 when the panel is in operating position.

By releasing the latch the panel can be swung outward so as to permit access to the lamps and so as to permit inspection of the inside of the oven.

With the conventional arrangement of parabolic reflectors with their axes at right angles to the direction of travel of the work in a conveyorized oven, the side surfaces parallel to the direction of travel intercept the maximum amount of energy and are heated to a relatively higher temperature than the end surfaces which receive only the uncontrolled radial energy from the lamp filaments. To overcome this, the lamps 26, 27, 28 and 29 with self contained directional reflectors are arranged preferably in groups of four made up of two pairs each with their axes diverging at acute angles to each other and to the plane of the panel, as illustrated in Figs 4a and 12. Individual pairs may also be used in special arrangements where desired.

Fig. 12 shows diagramatically a layout pattern of lamps with their axes arranged to cross and recross each other so as to reach all faces and recesses of articles such as suggested by the dotted circular and rectangular outline.

As manufactured, the relative inclination of the lamps is approximately 60° to the plane of the lamp panel along the axis of the panel and approximately 78° to the plane of the panel perpendicular to its axis. For clarity the first inclination will be spoken of as "horizontal," and the second will be termed "vertical."

The horizontal inclination of lamps is designed to serve the following purposes:

1. To more uniformly heat all exposed surfaces in the oven working zone regardless of their position with respect to the oven axis. Since a large majority of ovens are designed to handle three dimentional products on nominal heating cycles, energy in substantially equal concentration should be supplied to end as well as side surfaces to obtain uniform temperature. With the optical design I employ, the cosine values for energy interception from pairs of lamps becomes complementary. Thus heating at any point is always the result of radiation interception from lamps in two planes positioned so as to insure a combined cosine value of not less than unity. Heating is thus controlled to minimize the temperature difference between surfaces at various angles in the vertical plane of the oven.

2. To more uniformly heat exposed objects in the oven working zone regardless of size and consequent distance from the lamps. Objects farther away from the plane of the lamps will receive radiation from a larger number of lamps than objects close to the oven wall. This tends to correct for the reduction in energy from individual sources due to the inverse square relationship, the angular position of lamps improving this result with parabolic energy control from individual sources.

3. To provide more uniform heat distribution at low densities where lamps are installed on open spacings. Blank heating areas can be substantially avoided by the angular positioning of lamps which tends to increase the area of interception and overlap between individual beams.

Since the oven can be designed in cross-section to suit the general shape and overall size of products to be handled, the vertical inclination of lamps is designed to serve the following purposes:

1. Permit closer spacing of lamps to provide greater concentrations of energy with consequent reduction in the time cycle required to obtain a desired heating result.

2. Prevent longitudinal streaks or non-uniform heating due to the cumulative effect of filament striations on or near the axes of lamps and open areas between rows of lamps as may be necessitated by structural members between adjacent panels, etc.

3. Prevent bombardment of oppositely disposed lamp filaments to a degree that might otherwise reduce lamp life.

This combination of vertical and horizontal lamp inclinations provides important advantages since the large filaments, resulting from the relatively low filament temperature and high wattage of heating service lamps, prevents equally effective asymmetry of optical control by other means. Ovens can thus be designed with considerable latitude for handling a variety of products—thus affording great flexibility of application.

The inner wall of each panel has perforations 30 each of which accommodates the stems of two lamps each mounted in a socket 31 which is supported from the panel or by an intermediate bracket 32 secured to one wall of the panel so that air may circulate around the sockets and the stems of the lamps and prevent overheating and at the same time utilize the heat thus absorbed from the sockets and lamps in preheating the oven makeup air.

Each panel has a flange 35 coacting with a companion flange 36 on the outer wall of an adjacent tubular frame member or panel. Each sealing strip 37 coacts with the inner wall of a frame member or an adjacent panel. This is shown best in Figure 5. These flanges and strips are so located as to close the joints between the panels and the frame members and yet permit the panels to be swung outwardly.

Some of the frame members such as 17 have special wire ducts 38 (Fig. 5) for horizontal wiring. The vertical frame members 14, 15 are made in a hollow box or trough form for vertical wiring and connections to lamp panels. For this purpose each frame member 14 has a removable cover plate 14' (Fig. 3) to facilitate wiring. Wiring to the lamps in the panels may be made from these vertical troughs through the hollow hinges or pivots 23 into the panel sections. The pivots thus may serve both as wiring passages and as supports for the panel sections from the vertical frame.

The panels may have various cross sectional shapes such as 18', 18'' to support the lamps in the most effective position with respect to the products to be heated. The dotted lines 19' in Fig. 1 and 72, 73 in Fig. 10 represent the clearance outline of the lamp area on each panel.

Air may be circulated through the horizontal frame and panel members by a motor 40 and exhausted in any suitable manner as at 41, or discharged into the oven to provide convection heating.

The oven may be designed for continuous conveyor service as for instance by an overhead track 42 in Fig. 1.

Fig. 8 shows a housing 50 for treating articles carried on a belt conveyor or supported on spindles from a bar type conveyor 51. There the lamps are arranged in groups 52 and 53 constructed as before mentioned.

In Fig. 9 the oven 60 has an overhead track for carrying work 61 and groups of lamps 62, 63, 64 and 65 arranged in the most effective position for the work to be done.

In Fig. 10 the oven 70 is designed to treat work which moves through it on or guided by tracks 71, the lamps 72, 73 being arranged along the top and side walls in panels as before described.

In the form of oven shown in Fig. 11 the panels and framework are assembled to form a drying tower 75 to heat material 76 which may be in continuous sheet or lattice form or in the form of articles supported on a conventional bar type conveyor. Here the tower is in two parts 77, 77 with a chamber or passage 78 between them to facilitate access to the various lamp panels 79. Other panels 80 are accessible from outside.

In the various forms shown, wherever lamps are not needed, the holes for the lamps may be covered by pieces of sheet metal (not shown) held in place by the screws which ordinarily support the lamp brackets. In this way a hollow wall section for air circulation is maintained, and lamps are not used needlessly.

In locations where lamps may never be required, unpivoted and unpierced panels may be employed to complete the insulated enclosure.

All of the ovens shown are built up of standardized units or panels having the same vertical and horizontal dimensions. The longitudinal ribs or tubular frame members are also of standardized dimensions. These standard members are mounted between the transverse framework of structural wireways having standard sectional dimensions and carrying pivoted or rigid support provisions at standard spacings for the panel units and longitudinal ribs.

By mounting the lamps in standard panels so constructed that the lamps are supported within the panels and the panels hinged within a hollow framework, it is possible to build ovens out of standard stock items to accommodate almost any type or size of work, the hollow framework providing not only supports for the panels but ducts for electric wiring. The hollow ribs and panels also serve as wiring passages and provide space for heat insulation and for air circulation or preheating.

The method of heat distribution resulting from the angular positioning of lamps is important and highly advantageous in that it provides for the more uniform heating of three-dimensional objects, regardless of size and position; prevents cumulative heating from filament striations and avoids blank heating areas where lamps are used on open spacings for low density heating.

The panel and heating lamp support unit is claimed in my copending application Ser. No. 85,515, filed April 5, 1949.

I claim:

1. In an electrically heated oven, a number of hollow pivotal panel sections for supporting radiant heating lamps, a hollow frame including communicating tubular vertical and horizontal members and a tubular connection between each of said panel sections and each vertical member of the frame for pivotally supporting said panel sections, all of said elements being in communication with each other for circulating air therethrough and for guiding and protecting the wiring to the lamps each panel section being movable so as to expose externally of the oven the lamps carried by said sections and facilitate inspection of the oven and inspection and replacement of its lamps.

2. An electrically heated oven having tubular frame members constituting air ducts, hollow panel sections having sockets for supporting heating elements, means for pivotally supporting said panel sections between the tubular frame members, said means including air passages permitting circulation of air through said tubular members and said panel sections, said panel sections being independently operable to facilitate inspection of the inside of the oven, inspection of the sockets and replacement of heating elements carried by the respective sections.

3. In an electrically heated oven, an outer hollow wall comprising tubular ducts, a number of superposed elongated hollow panel sections, each containing sockets for heating elements facing the entrance of the oven, adjacent sections having communicating air passages, means for pivotally supporting on said ducts each section near one of its longer edges, each section having an edge overlapping an edge of an adjacent section, said sections being independently movable to facilitate access to the interior of the oven and access to the sockets in said section and means for circulating air through said frame sections.

4. In an electrically heated oven, a frame including tubular ducts for containing electric conductors and for the circulation of air, hollow panel sections containing sockets for heating elements, means for pivotally supporting each section near one of its edges on oppositely located ducts, said means including air passages connecting each section with a duct, said sections and ducts constituting a wall of the oven and edges of each section overlapping edges of the adjacent sections, adjacent edges of said sections having air passages which register when the sections are closed, said sections being openable to permit inspection of the interior of the oven and inspection of the heating elements carried by said sections.

5. In an electrically heated oven, a frame including tubular ducts for containing electric conductors and for the circulation of air, hollow panel sections containing sockets for heating elements, means for pivotally supporting each section near one of its edges on oppositely located ducts, said means including air passages connecting each section with a duct, said sections and ducts constituting a wall of the oven and edges of each section overlapping edges of the adjacent sections, said ducts constituting air passages and housings for electric conductors connecting the sockets of the respective sections, said sections being openable to permit inspection of the interior of the oven and inspection of the heating elements carried by said sections.

6. In an electrically heated oven, tubular frame members and hollow panel sections containing the sockets for heating elements and constituting an outer wall of the oven, a tubular pivotal connection between each end of each section and adjacent tubular frame members providing passages for and housing of electrical conductors, each panel section being adapted to swing outwardly with respect to the wall of which it is a part to facilitate access to the interior of the oven and for the inspection of the heating elements carried by said sections.

7. In an electrically heated oven, the combination of an outer wall composed of tubular frame elements extending parallel to each other and other parallel frame elements which are at right angles thereto, a bank of independently movable panel sections mounted between the frame elements, each panel section having a plurality of sockets for heating elements facing inwardly of the oven, each panel section being pivoted at its end near one of the edges to oppositely disposed frame elements and parallel with the frame elements which are at right angles to the frame elements to which the panel sections are pivoted and having one edge of each panel section contacting the adjacent edge of an adjacent panel section, and each panel section which is adjacent a parallel frame element having contact with the edge of said frame element when said panel sections are in closed positions, said tubular frame elements and the connected panel sections constituting ducts for electrical conductors leading to said sockets, said frame sections when swung outwardly on their pivots providing access to the inside of the oven and affording facility for inspecting and servicing the sockets and heating elements carried thereby.

PAUL HOMER GOODELL.

REFERENCES CITED

The following references are of record in the file of this patent:

UNITED STATES PATENTS

| Number | Name | Date |
|---|---|---|
| 1,630,237 | Smith | May 24, 1927 |
| 1,656,709 | Kelly | Jan. 17, 1928 |
| 1,885,041 | Baker | Oct. 25, 1932 |
| 2,048,777 | Brown | July 28, 1936 |
| 2,057,776 | Groven | Oct. 20, 1936 |
| 2,198,645 | Wolcott | Apr. 30, 1940 |
| 2,217,390 | Taub | Oct. 8, 1940 |
| 2,300,837 | Ames | Nov. 3, 1942 |
| 2,308,239 | Bell | Jan. 12, 1943 |
| 2,346,234 | Reynolds | Apr. 11, 1944 |
| 2,353,614 | Gardner | July 11, 1944 |
| 2,387,804 | Miskella | Oct. 30, 1945 |
| 2,418,283 | Wilson | Apr. 1, 1947 |
| 2,419,643 | Hudson | Apr. 29, 1947 |

FOREIGN PATENTS

| Number | Country | Date |
|---|---|---|
| 2,120 | Austria | Sept. 10, 1900 |